No. 793,688. PATENTED JULY 4, 1905.
G. B. SMITH.
MACHINE FOR COILING WIRE.
APPLICATION FILED OCT. 26, 1903.

No. 793,688. PATENTED JULY 4, 1905.
G. B. SMITH.
MACHINE FOR COILING WIRE.
APPLICATION FILED OCT. 26, 1903.

ATTEST.
INVENTOR.
Gary B Smith
By H. J. Frohn ATTY.

No. 793,688. PATENTED JULY 4, 1905.
G. B. SMITH.
MACHINE FOR COILING WIRE.
APPLICATION FILED OCT. 26, 1903.

ATTEST.
T. B. Moser
A. U. Moser.

INVENTOR.
Gary B. Smith
BY H. J. Fisher ATTY.

No. 793,688.

Patented July 4, 1905.

UNITED STATES PATENT OFFICE.

GARY B. SMITH, OF CLEVELAND, OHIO.

MACHINE FOR COILING WIRE.

SPECIFICATION forming part of Letters Patent No. 793,688, dated July 4, 1905.

Application filed October 26, 1903. Serial No. 178,452.

*To all whom it may concern:*

Be it known that I, GARY B. SMITH, a citizen of the United States, residing at Cleveland, in the county of Cuyahoga and State of Ohio, have invented certain new and useful Improvements in Machines for Coiling Wire; and I do declare that the following is a full, clear, and exact description of the invention, which will enable others skilled in the art to which it appertains to make and use the same.

My invention relates to wire-spring-coiling machines; and the invention consists in the construction and combination of parts substantially as shown and described, and particularly pointed out in the claims.

In the accompanying drawings.

The machine as thus shown is designed to produce a closely-wound tubular wire coil out of eight strands of wire according to this mechanism; but I might make a coil with more or fewer wires, if desired. Such coils are usually employed for bed-springs and are cut to the required length as finished articles as they leave this machine. Of course the coil is not necessarily cut off into lengths and may be made continuous and of very great length, if desired. However, the present machine is built with a coil-severing mechanism and is designed more especially to build springs for beds in which the several coils preferably run lengthwise of the beds and usually are cross-connected at intervals to give a practically woven-wire effect in so far as bringing the coils into coöperative relations are concerned.

Figure 18:
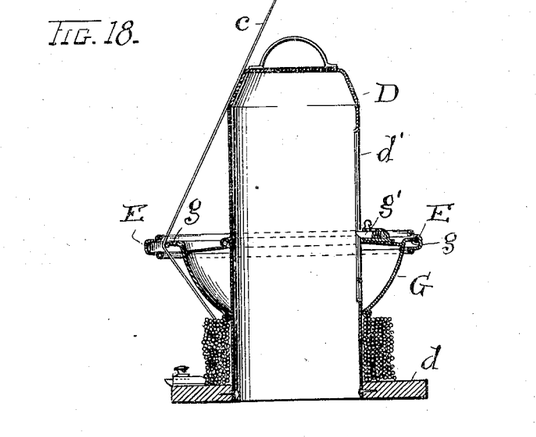
Fig. 18 is a vertical sectional elevation of said parts.

Now having reference first to the product of the machine, we have a closely-wound, compact, and exceedingly-firm and perfectly-uniform coil C, made from eight suitably-sized wires, four coming in one group $c$ and four in another group $c'$ to the former F. These wires have each their own core or drum D, on which the rolls of wire are carried and from which the wire strands are drawn as needed to produce the coil. These drums are each provided with a suitable base $d$, detachably supported in a bottom or frame beneath, so as to be individually removable. The roll or stock of wire is placed around the drum, and over it is a follower G, which encircles the drum and rests normally on the wire-roll and drops with it as the wire is used therefrom. The said follower has a horizontal flange $g$ about its outer top edge, on which is engaged a free ring E, made of sheet metal and of nearly U shape in cross-section. Said ring is engaged on flange $g$ and is about as much wider than said flange as is shown in Fig. 18, so that there is room to draw the wire strand through between them. The said strand is drawn up between said ring and flange, and as it runs around the flange in unwinding from the roll beneath it keeps crowding the ring E out at the point of its passage, while in the other portions the flange $g$ is more or less overlapped by the ring, so that the ring is kept in place by the flange. Thus the said ring has a kind of planetary movement on flange $g$ and keeps accommodating itself to the wire in its run around the follower. In this way a safe feed of wire is kept up, and there is no tangling or confusion in any of strands from start to finish. All the drums and associated parts are alike as to all eight wires. The follower G has a dog $g'$, which runs in a vertical channel $d'$ in the drum and permits vertical movement of the follower, but prevents rotation on the drum. The ring E does not rotate, but moves out and in as the wire $c$ runs around the drum and follower.

Figure 1:
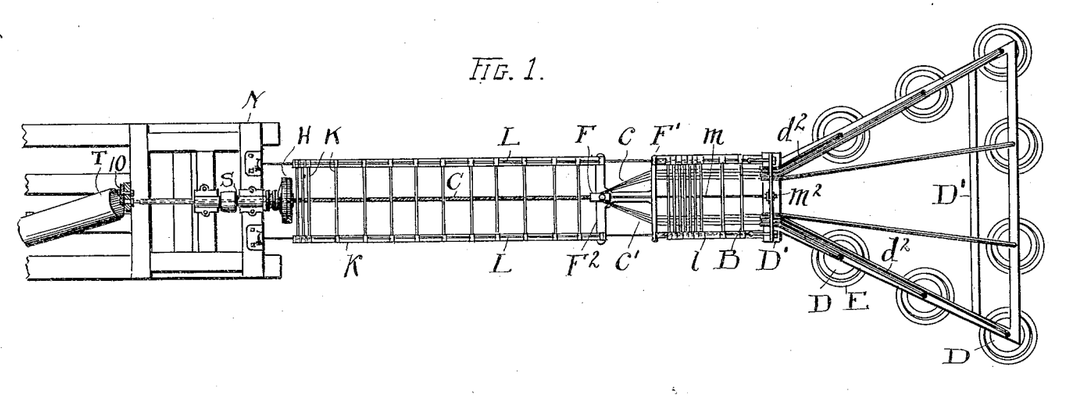
Figure 1 is a diagrammatic view of the main portion of the machine.
Figure 2:
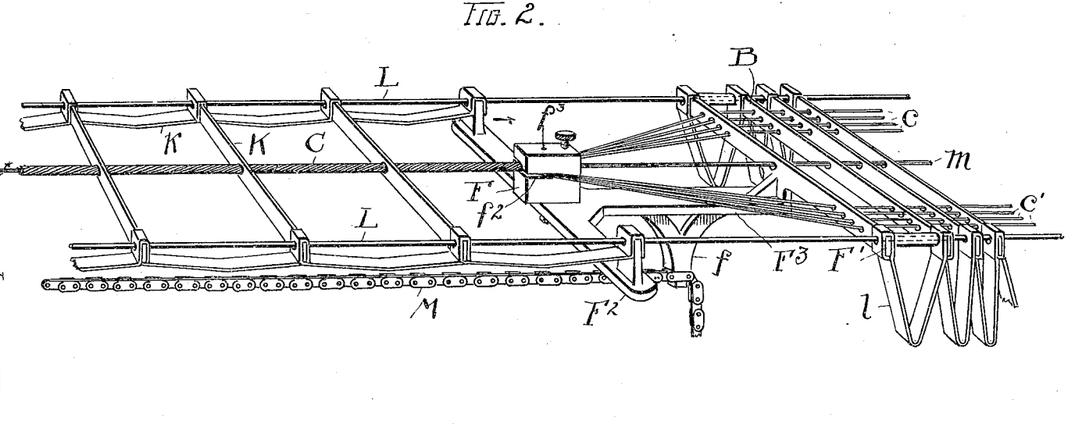
Fig. 2 is a perspective view considerably enlarged as compared with Fig. 1 and showing the former for producing the coil and the means for supporting the coil when made and the wires to produce the coil, as hereinafter fully described.

A suitable framework D' extends over and supports the several drums D and carries bent tubes or pipes $d^2$, one for each wire strand, through which said strands are drawn in their passage to the coil-former F. The several tubes $d^2$ converge at the front of frame D', Fig. 1, and wires $c$ and $c'$ pass thence through a series of supporting-bars B, perforated to thread the wires through and themselves slidably supported at their ends on fixed supporting-wires L. Flexible straps $l$ connect the ends of bars B and permit them to be drawn apart or separated within limits on their supports L. Then as former F is forced back in producing coil C these bars are also crowded back by means of the carrier-frame for the former, comprising cross-bars F' and $F^2$ and connecting portion $F^3$. The bars B are connected with bar F' by straps $l$, and so it occurs when bar F' is drawn forward with the follower to start again at the beginning of winding the said bars B will be drawn to spaced positions by their straps $l$, while the bars K on the opposite side of the former and which serve as supports and guides for coil C will be banked at the front next to the support H, as shown by a few of the said bars K near together in Fig. 1. Straps $k$ connect the several bars K with each other and with cross-bar $F^2$ of the former-frame, and when all the bars K are drawn out, as seen in Fig. 2, the former F presumably has reached its farthest limit of travel and is ready to be drawn back to starting-place. This is done through chain or cable M, connected with a depending portion $f$ of the former carriage or frame. Said chain not only carries the former F back, but operates through their several straps to make corresponding disposition of the several bars B and K and also to strip coil C off of the mandrel $m$. The said mandrel is a wire or rod of suitable size stretched taut from the chuck in support H on frame N at one end to a rotatable fastening $m^2$ on frame D' at the other end, and side wires or rods L, which carry cross-bars B and K, are fastened at one end to frame N and at the other to bolts upon the angle-bar on frame D'.

Figure 3:
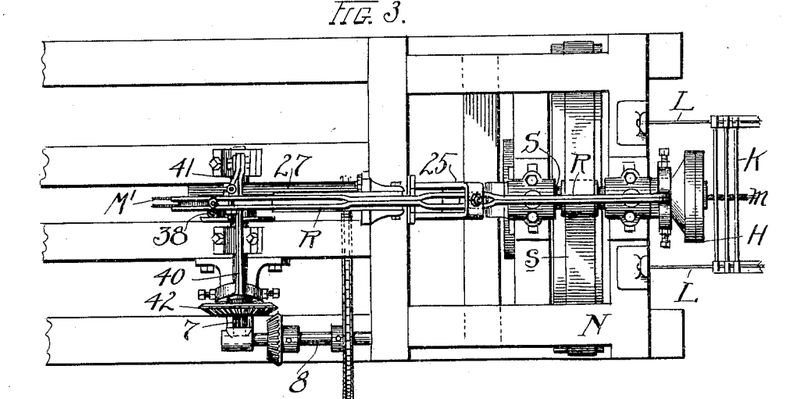
Figs. 3 and 4 are a plan view and a sectional elevation, respectively, of mechanism for rotating the coil and its mandrel and for various other purposes in that connection, as hereinafter fully described.
Figure 4:
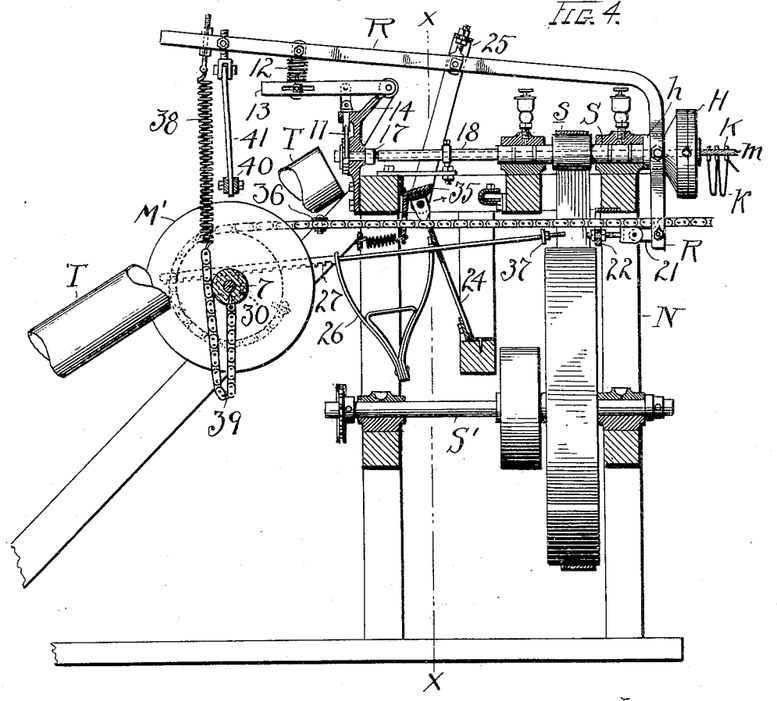
Figure 5:
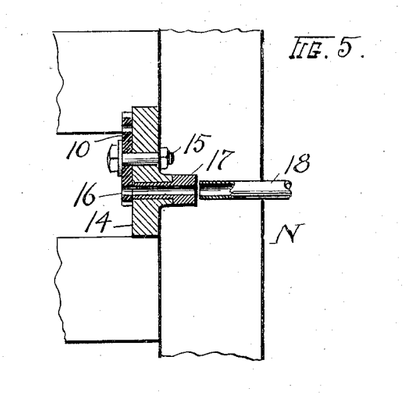
Fig. 5 is a sectional-elevation coil-severing disk on line $y\ y$, Fig. 6.
Figure 6:
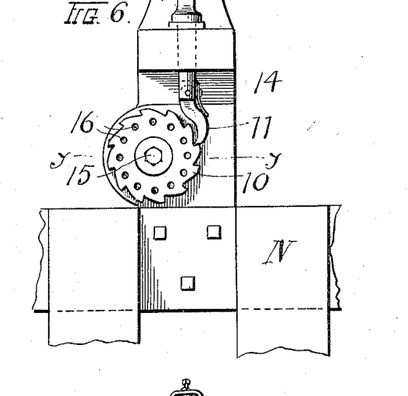
Fig. 6 is a plain elevation of the said mechanism and the pawl for rotating the disk.
Figure 7:
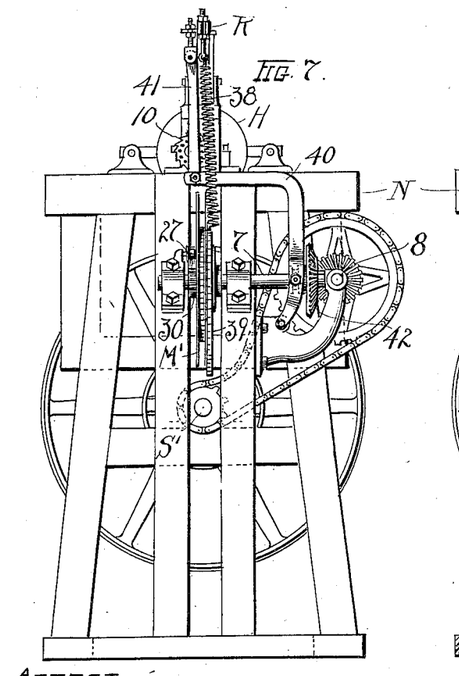
Fig. 7 is a rear elevation of the mechanism shown in Fig. 3.
Figure 8:
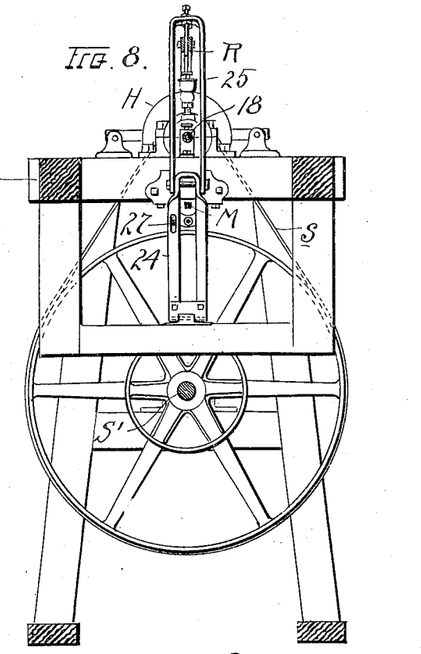
Fig. 8 is a cross-section of the said mechanism on line $x\ x$, Fig. 4.
Figure 9:
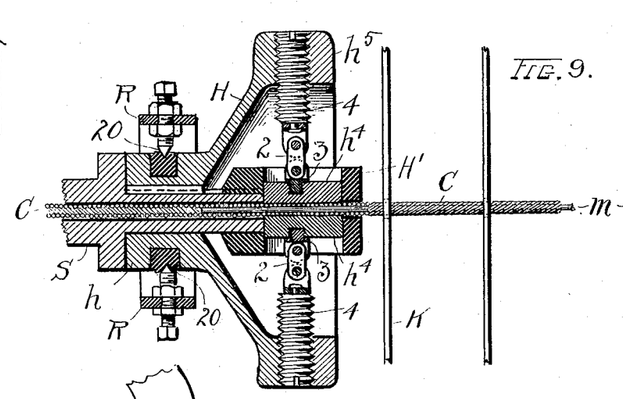
Fig. 9 is a horizontal sectional plan of the chuck for the mandrel and associated parts.
Figure 10:
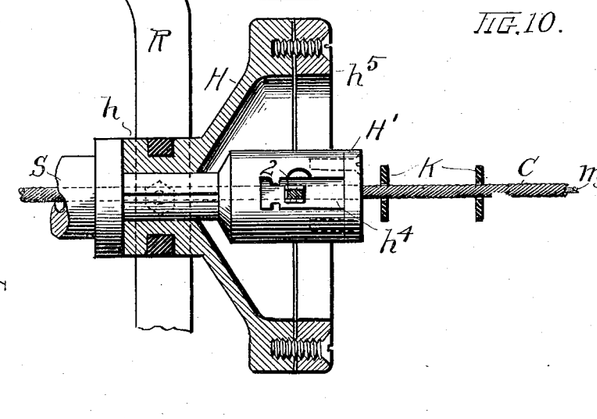
Fig. 10 is a horizontal section of the chuck mechanism on a line at right angles to Fig. 9, but leaving the chuck itself intact.
Figure 11:
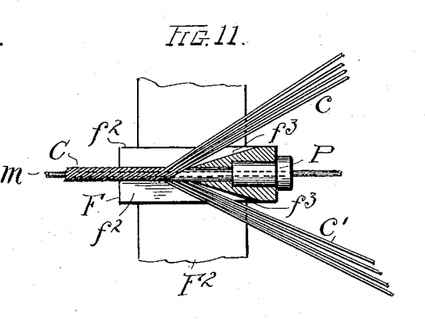
Fig. 11 is a cross-section of the coil-forming tube on a line corresponding to V V, Fig. 14, and enlarged considerably as compared with said figure.
Figures 12, 13, 14:
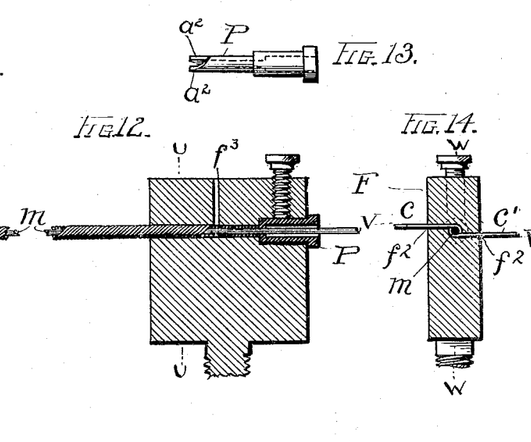
Fig. 12 is a sectional elevation of the former on line W W, Fig. 14.
Fig. 13 is a detail of the former-tube.
Fig. 14 is a cross-section on line U U, Fig. 12.
Figures 15, 16:
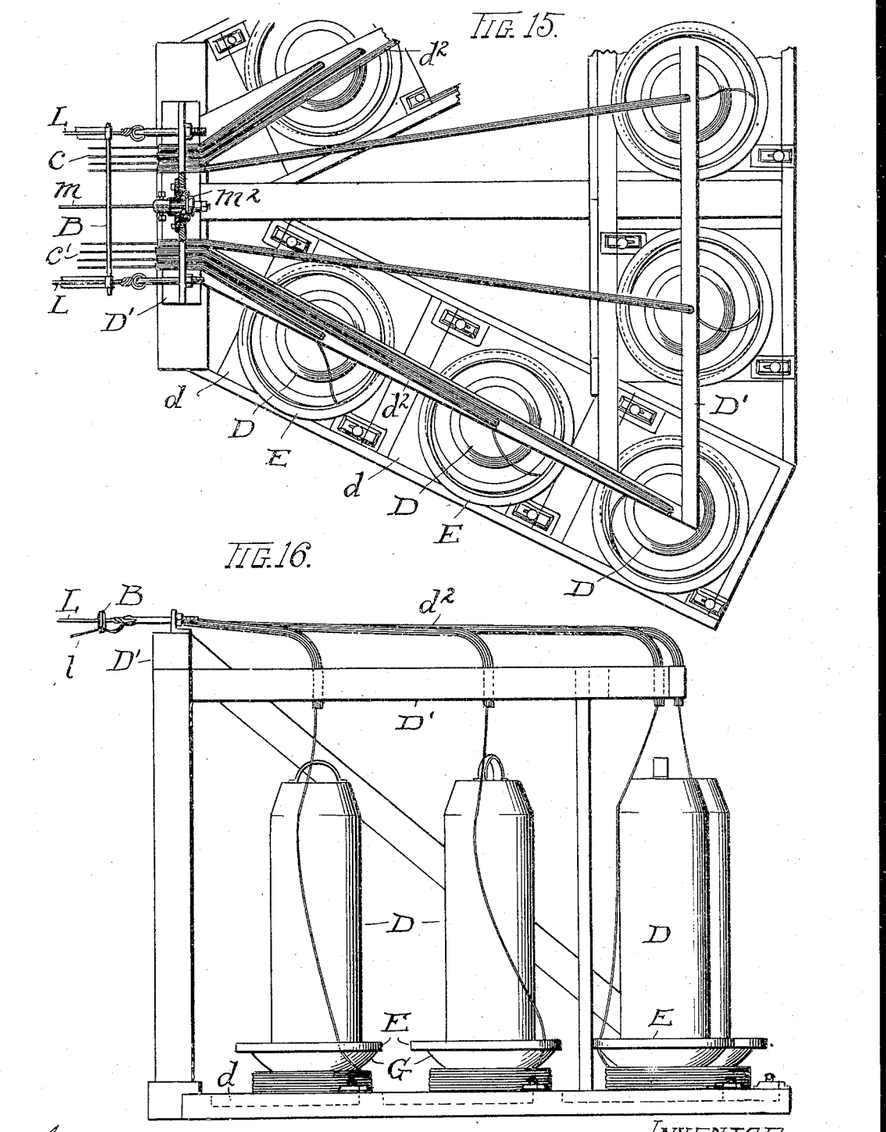
Fig. 15 is a plan view of the group of stands for the wire-rolls from which the strands of wire are drawn.
Fig. 16 is a side elevation thereof.
Figure 17:
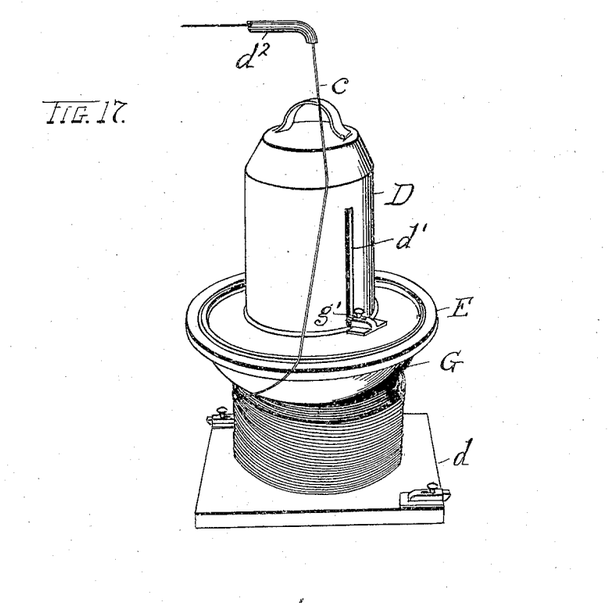
Fig. 17 is a perspective view, enlarged, of a core or drum or reel for a wire-roll.

The former F is seen most clearly in Figs. 11 and 12 and is shown in the form of a solid metallic block with a differential bore through its center to accommodate the former-tube P, which is inserted lengthwise in said bore and extends about half-way through the block and is fixed therein by a tightening-screw or other suitable means, so as to be and remain in fixed position. The bore of this tube accommodates the mandrel $m'$, which runs through the same, and its smaller inner end is provided with opposite notches, forming spurs having inclined edges, over which the wire strands are drawn and engaged and whereby the former is forced to feed or travel relatively as fast as winding occurs. These notches or spurs $a^2$ have depth enough endwise to receive four wire strands side by side. One such spur engages strands $c$ and the other strands $c'$, which feed in upon said tube above and below the same and are wound about the mandrel by fours through the direct action of former-tube P, relatively as seen in Figs. 11, 12, and 14. The smaller diameter of the former-tube is the same as the diameter of coil C, and by keeping the wire strands drawn taut and at the same time rotating the mandrel and the coil the wire is wound into the coil shown and the former and carriage are forced to travel to the right. The former-body F has two opposite slots $f^2$, with inclined walls $f^3$ running back in the direction of the feed of the wires, and these slots are substantially as narrow as the thickness of the wires, so that they prevent the wires doubling one upon the other and guide the wires evenly side by side to the notches in tube P, where the bending of the wires and forming of the coil takes place over the inclined edges of said notches or spurs. The coil and mandrel are rotated together by the chuck mechanism, in which they are firmly gripped. The body or support H of the said mechanism is supported on shaft S, which is itself supported in or on frame N, Figs. 3 and 4, and is driven by power from shaft S' or other source, a belt being shown here to communicate the power to shaft S. Shaft S projects beyond its adjacent bearing sufficiently far to affix part H and leave a projection beyond for the chuck proper, and part H has a hub $h$ splined to slide lengthwise on the shaft. A subhead H' is fixed rigidly upon the extremity of shafts S next beyond the hub of part H and carries the chuck proper, consisting of two opposite sections or parts $h^4$, slidably supported in head H' and constructed to firmly grip the coil on the mandrel and hold them as one together for joint rotation. The chuck-sections $h^4$ are connected with part H by links 2, pivotally engaged with threaded plugs 3 in said chucks at one end and screws 4 in part H at their other end. Then as part H is moved along on shaft S a comparatively short distance it either throws the links 2 onto their dead-center, as in Fig. 9, and binds the coil and mandrel together or loosens them by swinging links 2 off their dead-center. When loose or free from the pressure of the chuck, the coil can be withdrawn from the mandrel, and such releasing and withdrawal occurs when a full length of coil has been produced. This is done by drawing the coil off the mandrel through shaft S and other parts bored for that purpose, as clearly shown. A rim or ring $h^5$ constitutes an operative portion of support H and has part of the thread for screws 4 cut therein and is supported on the main portion of H by screw-bolts, so that when screws 4 are adjusted they can be clamped and held firmly by tightening ring $h^5$. Now when the former has reached the limit of its travel it is stopped by the release of the chuck mechanism, through which the coil and mandrel are rotated together and the coiling in the former is accomplished. Hence and obviously the former is fixed against rotation and with its supporting-frame $F' F^2$ is adapted to be drawn back to starting position by cable M, as already explained. This occurs and the coil is stripped from the mandrel by such return of the former, when the former is again drawn near to chuck H and is in readiness to make another spring or coil length. The cable M is actuated by means of the deep-flanged drum M', on which it is wound, and said drum has power connection through shaft 7, on which it is mounted, and thence by gears with shaft 8, driven by sprocket-chain or otherwise from the power-shaft S'. Any suitable drive mechanism may be employed for each and all of these several parts, according as said parts may be positioned or related in the machine. As drum M' is rotated it winds chain M about it and draws the former F back and forces the stripped coil into tube T, from whence it is delivered by hand or otherwise; but this cannot occur until the coil is cut off. Any suitable shearing or cutting mechanism may be employed; but in this instance I employ a ratchet-disk 10, adapted to be rotated by pawl 11 from main lever R through a spring 12, interposed between said main lever and short lever 13, having a link connection with the upper end of said pawl. A bracket 14 supports the parts 10, 11, and 13 and affords a guide for the pawl. The disk 10 is held to its work flush at the side of bracket 14 by bolt 15 and has a series of holes 16 adapted in turn to register with a short tubular coil-guide 17, projecting into bracket 14 and adapted to receive the coil from pipe 18 next adjoining and which extends to hollow shaft S, carrying head H. Thus the coil C is kept under mechanical control until it is cut into lengths and delivered. Yet the cutter 10 may be omitted, if it be desired to make the coil a continuous one, and severing of the coil is not necessary to the further operation of the machine. When the former has traveled to the end of its run, the chuck-support H is moved bodily back upon shaft S far enough to throw links 2 out of pressure upon the chuck-sections $h^4$, and thus release coil C on the mandrel. This operation is accomplished through lever R, which is bent down at right angles at its front and is yoke-shaped, with threaded and adjustable pivot-points 20 in the hub-ring of part H. Links 21 connect said yoke extension of lever R with a fixed bracket 22 beneath the bearing for shaft S, thus providing a pivot-point for lever R where its leverage will be most effective when the lever is raised at its free end to shift support H. Such raising of said lever may be variously effected; but one way, as shown, is to employ a set of toggle yokes or members 24 and 25, pivotally connected, and the member 24 supported at its lower end on main frame N and the upper end of yoke 25 pivotally connected with lever R near its middle portion. A substantially V-shaped or forked spring 26 carries a free rack-bar 27 in its forked ends, and which also runs through member 24 and has a nut on its end adapted to bear against said member and throw it back into inclined position, as in Fig. 4. This is its normal position, as when the machine is at work making a coil; but when the lever R is to be operated to liberate the chuck on the coil and mandrel the spring 26 is compressed to throw the two members 24 and 25 into alinement, and which raises lever R and throws chuck-support H forward and releases the chuck. Bar or rod 27 has teeth in its rear portion engaging a pinion 30 on shaft 7, and as drum M' is rotated by the unwinding of cable M therefrom during the process of making the coil the rotation of pinion 30 on the same shaft carries spring 26 forward until it is compressed sufficiently to throw yoke 25 and part 24 forward, where a pivoted catch 35 on frame N is engaged by adjustable nut or button 36 on chain M, and whereby release of part 24 is effected. When nut 37 on rack-bar 27 is carried back so as to engage part 24 and reverse the position of chuck-support H, the operation is accentuated and a strong positive movement is given to lever R through spring 38 and its chain 39, which latter is wound about shaft 7 as rack-bar 27 is carried back and spring 38 is brought to acting relation just as bar 27 does its work on member 24. Thus also shift-lever 40 is operated through link 41, connecting it with main lever R, and controlling-gear 42 on shaft 7 is brought into mesh with its companion gear on shaft 8, which shaft is running continuously.

In the manufacture mandrel $m$ is of smaller diameter than the opening or inner diameter of the coil when eventually produced and after stripping from the mandrel. When the chuck members release their hold of the spring and mandrel, the spring uncoils itself to a certain degree and frees itself from the mandrel, whereby stripping is easily effected.

Practically the work of making the coil is done by the former-block F and former-tube P, and while the twist or bend of the wire begins as it is wound over the spurs $a^2$ of the former-tube the bore of the block is such that it serves to set or help set the coil to a fixed and uniform diameter. In other words, when the coil emerges from block F, in which it gets its size and shape, it remains in that form. A lubricating-hole $f^3$ is provided to introduce oil to the spurs of the former-tube.

What I claim is—

1. In a wire-coiling machine, a former for a coil having openings to enter the wires at two different points and a device therein having spurs over which the coil is formed, substantially as set forth.

2. A former for a wire-coiling machine, consisting of a head having a bore the size of the coil and opposite openings leading to said bore to enter the wires, and a device having opposite spurs at its end over which the wires are drawn in forming the coil.

3. In a wire-coiling machine, a former-head having a central bore of the cross-section of the coil to be made and side slots entering said bore, a tube set into said head having its inner end provided with spurs substantially opposite the slots in said head, said parts fixed together, substantially as set forth.

4. A former for wire coils comprising a head with a central bore and flat-sided side slots at opposite sides open to said bore, a tubular device having spurs on its ends set into said bore, and a mandrel running through said parts, head and said tubular device.

5. In a wire-coiling machine, a coil-forming head having uniform lateral slots with diverging rear edges, a former-tube in said head having spurs at its inner extremity with oppositely-inclined edges, a mandrel through said parts and a carriage for said head, substantially as set forth.

6. In a wire-coiling machine, a coiling-head having a forming-tube inserted part way therein and provided with spurs on its extremity to engage the wires, said parts constructed to feed a series of wires to said head from each side on said spurs, whereby one set of wires will be thrown over one side of the tube and the other set over the other side thereof, in combination with a mandrel around which said wires are wound, substantially as set forth.

7. In a wire-coiling machine, a suitable wire-coiling head having slots to admit the wires and a forming-tube provided with spurs to engage the wires and wind the same in said head, said head and tube fixed rigidly together, a mandrel projecting through said head and tube, means to rotate the mandrel and a carriage on which the head is fixed against rotation, substantially as set forth.

8. A wire-coil-forming mechanism and a series of drums constructed to support the rolls of wire from which the coil is made, a series of transversely-arranged guide-bars for the strands of wire and flexible connections uniting the ends of said bars, substantially as set forth.

9. The machine described having a forming-head for the coil and a series of drums to carry the rolls of wire, a series of transversely-arranged guide-bars for the strands of wires, flexible connections between said bars, and guide-rods on which the ends of the bars are slidably supported, substantially as set forth.

10. In a wire-coiling machine, a hub adapted to carry a roll of wire, a follower sleeved over said drum and a ring about said follower and free to play up and down thereon, whereby the strand of wire can be drawn off between the ring and follower and is free to run around the drum, substantially as set forth.

11. In a wire-spring-coiling machine, a drum to support a roll of wire and a follower thereon provided with a lateral flange about its top and a loose ring on said flange, said ring and flange constructed to permit the strand of wire to be drawn through between them and to run around same as it is unwound from the drum, substantially as set forth.

12. In a wire-spring-coiling machine, a suitable drum to support a roll of wire, a follower sleeved over the drum and adapted to rest over the wire, and a ring substantially U shape in cross-section loosely engaged over the upper edge of the said follower, thereby affording room for the wire strands to be drawn between said parts and to run around the follower, substantially as set forth.

13. In a wire-spring-coiling machine, a drum to carry a roll of wire and a follower thereon adapted to slide up and down, a ring substantially U shape in cross-section engaged upon the upper edge of said follower and free to move in and out thereon, thereby providing a space between said parts for a wire strand to run around the follower, in combination with a coil-forming mechanism and means to guide said wire strands to said mechanism, substantially as set forth.

14. In a wire-spring-coiling machine, a suitable former and a frame carrying the same, supports on which said frame is adapted to travel and a series of guides for the finished coil engaged on said supports, substantially as set forth.

15. In a wire-spring-coiling machine, a former for the coil and a carrier therefor and side supports for said carrier, in combination with a series of connected guide-bars for the strands of wire leading to the former, a series of connected guide-bars for the finished coil, and said guide-bars connected with the said carrier, and means to move the former back to starting position, substantially as set forth.

16. In a wire-spring-coiling machine, a shaft having a head on its extremity and a sectional chuck in said head and a chuck-support having toggle-link connection with the chuck-sections, and means to slide said support within limits and thereby tighten or loosen the chuck, substantially as set forth.

17. In a wire-spring-coiling machine, a shaft and a chuck-support slidable thereon, a head fixed on the end of said shaft and a sectional chuck therein, toggle-links connecting the said support and the chuck-sections, and means to slide said support comprising a suitable lever, substantially as set forth.

18. In a wire-coiling machine, a tubular power-driven shaft having a bore for the wire coil, a chuck-support slidably mounted on said shaft and a sectional chuck mounted within said support on the end of said shaft, a mandrel extending through said chuck and shaft, and means to slide the chuck-support on the shaft, said support having link connections with said chuck, substantially as set forth.

19. In a wire-spring-coiling machine, a mandrel about which the coil is formed, means to strip the coil from the mandrel, a rotatable device to cut the coil in lengths, and means to actuate said device comprising a pawl and a lever to actuate the pawl, substantially as set forth.

20. In a wire-spring-coiling machine, a former for the coil and a carrier and supports on which the carrier is slidable, in combination with a cable connected with said carrier, and a drum to wind up the cable and thereby withdraw the former to starting position, substantially as set forth.

21. In a wire-spring-coiling machine, a suitable former and a carrier therefor and guideways for the carrier, in combination with a drum and a cable thereon connected with said carrier, a mandrel and a chuck to clamp the coil upon the mandrel, whereby the former is moved through the rotation of the chuck as the coil is formed and the coil is stripped from the mandrel when the chuck is released, substantially as set forth.

22. In a wire-spring-coiling machine, a tubular shaft and a chuck-support mounted thereon, said support being slidable on the shaft and connected with the chuck by links, in combination with a pivoted lever for throwing the chuck-support back and forth, and means to automatically actuate said lever and change the position of the chuck-support at predetermined times, substantially as set forth.

In testimony whereof I sign this specification in the presence of two witnesses.

GARY B. SMITH.

Witnesses:
R. B. MOSER,
C. A. SELL.